(12) United States Patent
Doyle (10) Patent No.: US 9,167,102 B2
(45) Date of Patent: Oct. 20, 2015

(54) SEPARABLE BILLING FOR PERSONAL DATA SERVICES

(75) Inventor: Thomas F. Doyle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/399,707

(22) Filed: Feb. 17, 2012

(65) Prior Publication Data

US 2013/0052988 A1 Feb. 28, 2013

Related U.S. Application Data

(63) Continuation of application No. 13/283,803, filed on Oct. 28, 2011, and a continuation of application No. 11/763,302, filed on Jun. 14, 2007, now abandoned, which is a continuation of application No. 10/633,143, filed on Jul. 31, 2003, now Pat. No. 8,060,419.

(51) Int. Cl.
| | |
|---|---|
| *H04M 3/42* | (2006.01) |
| *H04M 15/00* | (2006.01) |
| *G07F 19/00* | (2006.01) |
| *G06Q 30/04* | (2012.01) |

(52) U.S. Cl.
CPC .............. *H04M 15/44* (2013.01); *G06Q 30/04* (2013.01); *H04M 15/00* (2013.01); *H04M 2215/0104* (2013.01); *H04M 2215/2013* (2013.01)

(58) Field of Classification Search
USPC .......................................................... 705/34
See application file for complete search history.

(56) References Cited

U.S. PATENT DOCUMENTS

| | | | | |
|---|---|---|---|---|
| 5,247,571 | A * | 9/1993 | Kay et al. ................. | 379/221.09 |
| 5,329,578 | A * | 7/1994 | Brennan et al. .......... | 379/211.03 |
| 5,561,706 | A * | 10/1996 | Fenner ......................... | 455/406 |
| 5,754,633 | A * | 5/1998 | Levy ........................ | 379/114.21 |
| 5,825,865 | A * | 10/1998 | Oberlander et al. ...... | 379/211.02 |
| 5,873,030 | A * | 2/1999 | Mechling et al. ............ | 455/408 |
| 5,889,958 | A * | 3/1999 | Willens ......................... | 709/229 |
| 5,987,325 | A * | 11/1999 | Tayloe ...................... | 455/435.2 |
| 6,026,292 | A * | 2/2000 | Coppinger et al. .......... | 455/406 |
| 6,073,007 | A * | 6/2000 | Doyle ........................ | 455/412.2 |
| 6,122,357 | A * | 9/2000 | Farris et al. .............. | 379/207.02 |
| 6,233,618 | B1 * | 5/2001 | Shannon ....................... | 709/229 |
| 6,282,274 | B1 * | 8/2001 | Jain et al. ................ | 379/114.26 |

(Continued)

FOREIGN PATENT DOCUMENTS

| | | |
|---|---|---|
| WO | WO0143377 | 6/2001 |
| WO | WO2005013555 | 2/2005 |

OTHER PUBLICATIONS

International Search Report and Written Opinion—PCT/US2008/064343—ISA/EPO—Oct. 30, 2008.

*Primary Examiner* — Ashford S Hayles
(74) *Attorney, Agent, or Firm* — Gerald P. Joyce, III (57) ABSTRACT

A billing system and method for providing both business and personal data access to a user of a wireless communications device is provided. A user enters an access request, and it is determined if the access request is a personal type access request or a business type access request. Personal type access requests are processed in order to provide billing for the personal requests to the user of the wireless communications device, and business type access requests are processed to provide billing to the business. Such systems and methods provide enhanced convenience to mobile workers while avoiding additional costs associated with such services being incurred by the business.

30 Claims, 6 Drawing Sheets

(56) References Cited

U.S. PATENT DOCUMENTS

| | | | |
|---|---|---|---|
| 6,580,367 B2* | 6/2003 | Roach | 340/471 |
| 6,584,500 B1* | 6/2003 | Arkko | 709/223 |
| 6,668,046 B1* | 12/2003 | Albal | 379/119 |
| 6,795,856 B1* | 9/2004 | Bunch | 709/224 |
| 6,879,838 B2* | 4/2005 | Rankin et al. | 455/456.6 |
| 6,892,131 B2* | 5/2005 | Coffee et al. | 701/482 |
| 6,925,160 B1* | 8/2005 | Stevens et al. | 379/121.05 |
| 6,956,935 B2* | 10/2005 | Brown et al. | 379/114.21 |
| 6,977,998 B2* | 12/2005 | Brown et al. | 379/114.21 |
| 7,103,656 B2* | 9/2006 | Lewis et al. | 709/223 |
| 7,542,556 B2* | 6/2009 | Bright et al. | 379/114.01 |
| 7,849,173 B1* | 12/2010 | Uhlik | 709/223 |
| 7,873,001 B2* | 1/2011 | Silver | 370/329 |
| 7,917,394 B2* | 3/2011 | Borelli et al. | 705/26.1 |
| 2002/0026575 A1* | 2/2002 | Wheeler et al. | 713/156 |
| 2002/0029197 A1* | 3/2002 | Kailamaki et al. | 705/40 |
| 2002/0042715 A1* | 4/2002 | Kelley | 705/1 |
| 2002/0090927 A1* | 7/2002 | Allande et al. | 455/408 |
| 2002/0174335 A1* | 11/2002 | Zhang et al. | 713/168 |
| 2002/0188562 A1* | 12/2002 | Igarashi et al. | 705/40 |
| 2003/0026404 A1* | 2/2003 | Joyce et al. | 379/144.01 |
| 2003/0083913 A1* | 5/2003 | Wolfe et al. | 705/7 |
| 2003/0083988 A1* | 5/2003 | Reith | 705/40 |
| 2003/0091171 A1 | 5/2003 | Lopez Aladros et al. | |
| 2003/0093518 A1* | 5/2003 | Hiraga | 709/224 |
| 2003/0114141 A1* | 6/2003 | Offer | 455/406 |
| 2003/0119479 A1* | 6/2003 | Arima et al. | 455/408 |
| 2003/0123628 A1* | 7/2003 | Rhodes | 379/114.01 |
| 2003/0144929 A1* | 7/2003 | Wakamatsu | 705/30 |
| 2003/0182420 A1* | 9/2003 | Jones et al. | 709/224 |
| 2003/0224781 A1* | 12/2003 | Milford et al. | 455/426.1 |
| 2003/0233580 A1* | 12/2003 | Keeler et al. | 713/201 |
| 2004/0002324 A1* | 1/2004 | Juntunen et al. | 455/406 |
| 2004/0005873 A1* | 1/2004 | Groenendaal et al. | 455/410 |
| 2004/0039504 A1* | 2/2004 | Coffee et al. | 701/35 |
| 2004/0053599 A1* | 3/2004 | Karaoguz et al. | 455/408 |
| 2004/0208151 A1* | 10/2004 | Haverinen et al. | 370/338 |
| 2004/0242262 A1* | 12/2004 | Turner | 455/550.1 |
| 2004/0254866 A1 | 12/2004 | Crumbach et al. | |
| 2004/0259525 A1* | 12/2004 | Kotzin | 455/406 |
| 2005/0027625 A1 | 2/2005 | Doyle et al. | |
| 2005/0086138 A1* | 4/2005 | Prange | 705/34 |
| 2005/0238151 A1* | 10/2005 | Brown et al. | 379/114.01 |
| 2005/0281263 A1* | 12/2005 | Miyamoto et al. | 370/389 |
| 2006/0041505 A1* | 2/2006 | Enyart | 705/40 |
| 2006/0168303 A1* | 7/2006 | Oyama et al. | 709/231 |
| 2007/0124802 A1* | 5/2007 | Anton et al. | 726/3 |
| 2008/0130846 A1* | 6/2008 | Brown et al. | 379/93.12 |
| 2008/0242289 A1* | 10/2008 | Marui et al. | 455/422.1 |
| 2008/0242356 A1* | 10/2008 | Marui et al. | 455/566 |
| 2008/0312941 A1 | 12/2008 | Doyle | |
| 2009/0017788 A1 | 1/2009 | Doyle et al. | |
| 2010/0287237 A1* | 11/2010 | Gross et al. | 709/204 |

* cited by examiner

SEPARABLE BILLING FOR PERSONAL DATA SERVICES

CROSS-REFERENCE TO RELATED APPLICATIONS

Priority under 35 U.S.C. 120 is claimed to: U.S. Non-provisional application entitled, "SEPARABLE BILLING FOR PERSONAL DATA," filed on Jun. 14, 2007 and assigned application Ser. No. 11/763,302; and U.S. Non-provisional application entitled, "METHOD AND APPARATUS FOR PROVIDING SEPARABLE BILLING FOR PERSONAL DATA," filed on Oct. 28, 2011 and assigned application Ser. No 13/283,803 which in turn claims priority to U.S. Non-provisional application entitled, "METHOD AND APPARATUS FOR PROVIDING SEPARABLE BILLING FOR PERSONAL DATA," filed on Jul. 31, 2003, assigned application Ser. No 10/633,143 and subsequently issued as U.S. Pat. No. 8,060,419. The entire contents of these applications are hereby incorporated by reference.

BACKGROUND

1. Field

The technology of the present application relates to mobile communication systems. More particularly, the present application relates to a method and apparatus for providing separable personal and business mobile communications services, including voice and data services, using a wireless communications system.

2. Background

Wireless communications systems find wide spread use in numerous different and personal applications. Increasingly, communications systems are capable of providing voice and data access over a wireless communications network. Particularly, such data access is increasingly used to access data over data networks, such as web sites over the internet. In many cases, voice communications and data communications are billed separately, with air time charges and charges for data access having different rate structures.

One application of wireless communications devices with increasing reliance on both voice and data communications is in wireless fleet communications systems that allow vehicles in a commercial vehicle fleet, such as tractor-trailer trucks, to stay in communication with a dispatch, or central management office, using a wireless communications network. The wireless communications network may include wireless satellite links, and wireless cellular links. The wireless links are formed by radio frequency (RF) signals relayed between mobile communications terminals, such as wireless devices contained within a vehicle, and a central server using the satellites or cellular base stations. Mobile communications terminals in such applications often include a computer or processor coupled with a RF transceiver system to send and receive communications over the wireless network. Often, the communications terminal includes a user interface including a keyboard and user display and may also include an interface for voice communications, including a microphone and speaker.

The dispatch may use the wireless communications network and associated mobile terminals for communications including vehicle locations, load status, instructions to the driver as to the next destination and/or source to deliver and/or pick up materials, to name but a few. Furthermore, in applications that provide network access, drivers may access different network sites using the communications terminal to obtain information that may be used to assist the driver in making a particular delivery. For example, a driver may access a navigation site or mapping site to provide a route to a particular destination, or to find an alternate route in the event that a standard route is unavailable for any reason. Such information enables a dispatch to better assess the state of and control its vehicle fleet, and also allows operators of vehicles to perform their jobs more efficiently. Thus, overall efficiency of a particular vehicle fleet is enhanced due to the increased connectivity between a vehicle and dispatch.

While conducting business related communication using a wireless network for such vehicles enhances the efficiency of the business in general, users of such mobile terminals often desire to use the mobile terminals for personal business in addition to business related use. For example, a driver of a vehicle may desire to place a personal call using a telephone function of a mobile terminal, and/or may desire to access a network location, such as an internet site, that is not related to the business. Furthermore, with respect to network access, including internet access, it is further convenient for a driver of the vehicle to access the internet through such a system as internet access is limited while traveling. While understanding that such non-business uses provide a significant convenience for a driver, a business typically does not desire to bear the additional costs for such access to the wireless network.

SUMMARY

Embodiments disclosed herein address the above stated needs by providing for separate billing of personal and business data services. In one aspect, a method is provided for providing business and personal data access service to a wireless communications device in communication with a server that has access to a network, comprising the steps of (a) receiving a request from a wireless communication device to access data located at a network site, (b) determining whether the received request comprises a business type request or a personal type request, (c) processing the received request in a first manner if the received request comprises a business type request; and (d) processing the received request in a second manner if the received request comprises the personal type request. The step of processing the business type request in a first manner may comprise the billing a business entity associated with the wireless communications device, and the step of processing the personal type request in a second manner may comprise billing a user associated with the wireless communications device. 8. The method of claim 1, wherein said received request comprises a first uniform resource locator (URL). The step of determining whether the received request comprises a business type request or a personal type request may include various different determinations, such as determinations based on comparing uniform resource locators (URLs) of the request with business-related URLs, comparing routing characteristics of the request with business-related routing characteristics, and analyzing the data at the network site to determine if the data corresponds to business type data.

In another aspect, an apparatus is provided that allows business and personal Internet access to a fleet of vehicles in communication with a central server, the apparatus comprising a computer for receiving an Internet access request transmitted by a remote terminal that determines whether the request comprises a business type request or a personal type request. Business type requests may be processed in a first manner and personal type requests processed in a second manner. The business type requests may be processed to provide billing to an account associated with said fleet of vehicles, and personal type requests may be processed to provide billing to account associated with a user of the remote terminal.

In another aspect, a tangible data storage medium is provided that comprises executable data capable of causing a programmable device to perform the steps of: (a) receiving a request from a wireless communication device to access data located at a network site, (b) determining whether the received request comprises a business type request or a personal type request; (c) processing the received request in a first manner if the received request comprises a business type request; and (d) processing the received request in a second manner if the received request comprises a personal type request. The step of processing the business type request in a first manner may comprise billing a business entity associated with the wireless communications device, and the step of processing the personal type request in a second manner may comprise billing a user associated with the wireless communications device.

The foregoing and other features, utilities and advantages of the technology of the present application will be apparent from the following more particular description of embodiments of the technology as illustrated in the accompanying drawings

BRIEF DESCRIPTION OF THE DRAWINGS

The features and advantages of the technology of the present application will become more apparent from the detailed description set forth below when taken in conjunction with the drawings, wherein.

DETAILED DESCRIPTION

For a more complete understanding of the technology of the present application, reference is now made to the following detailed description of several embodiments as illustrated in the drawing figures, in which like numbers represent the same or similar elements. The word "exemplary" is used herein to mean "serving as an example, instance, or illustration." Any embodiment described herein as "exemplary" is not necessarily to be construed as preferred or advantageous over other embodiments.

The present disclosure recognizes the desirability of providing personal data services as well as business related data services using mobile communications equipment associated with vehicles and/or other mobile communications devices used by employees or others that are associated with a business. The employees and/or other mobile workers of such businesses may want to utilize various personal data services, such as web access, using the mobile equipment, in addition to the business related data services. However, such personal usage may incur significant additional costs, and a business may not desire to pay for such personal usage. Exemplary embodiments described herein provide a separable billing system and method so that such services may be provided to a mobile worker, including personal and business services with billing as appropriate for each of the services to the business or user of the mobile device. Such systems and methods provide significant enhanced convenience to mobile workers while avoiding additional costs associated with such services incurred by the business.

Figure 1:
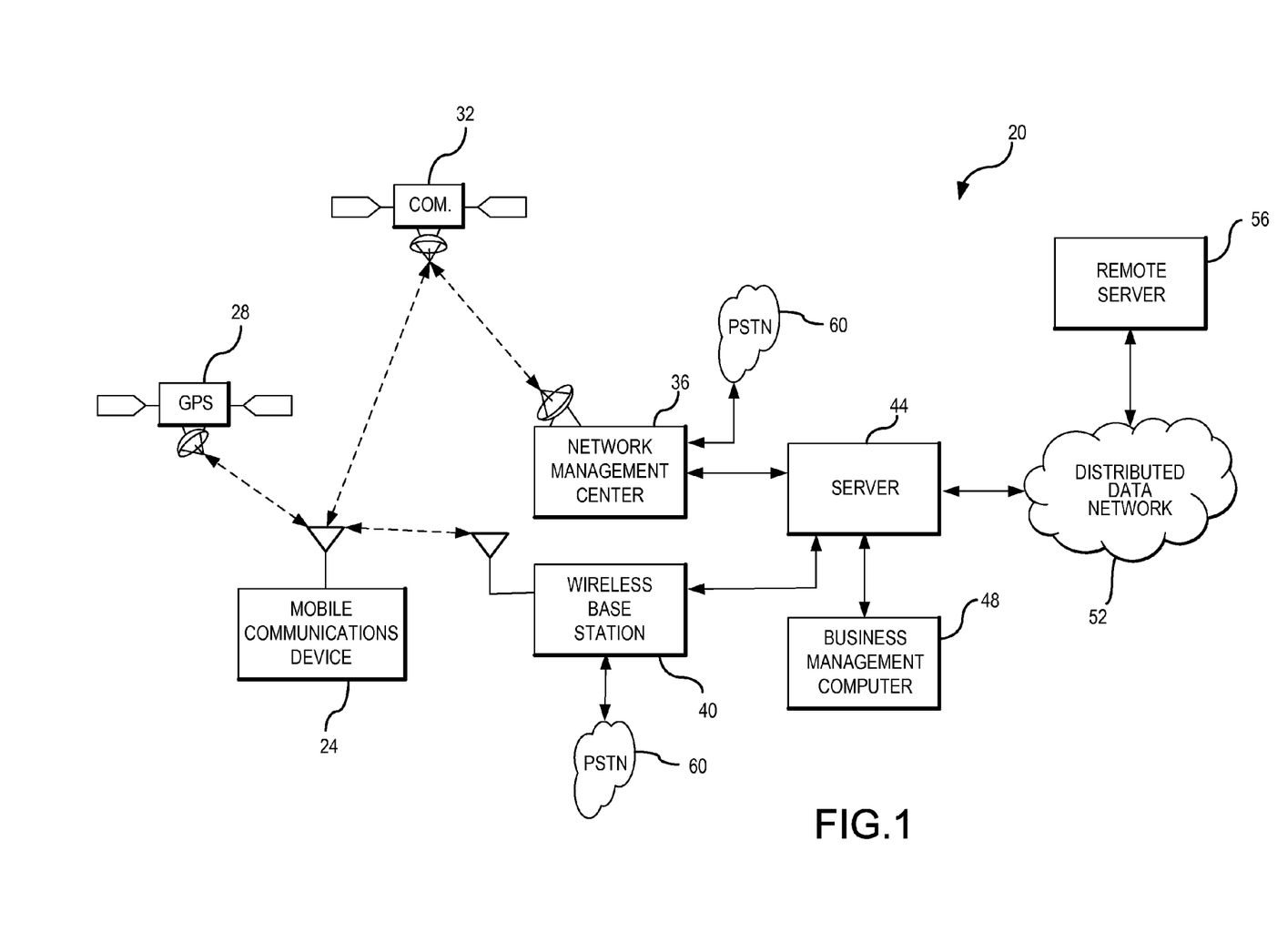
FIG. 1 is a block diagram of a wireless communications network and associated servers and networks in accordance with an exemplary embodiment.

Referring now to FIG. 1, a block diagram illustration of a wireless communications system 20 configured in accordance with one exemplary embodiment is described. Mobile communications device 24 is operable to wirelessly communicate with one or more of a number of different wireless systems. In this embodiment, the mobile communications device 24 is capable of providing voice and data communications to a user. Such voice communications are traditional type communications, and data communications may provide both graphical and text communications. For example, a mobile communications device 24 may have an interface that is capable of providing text, such as messages sent to a driver of a vehicle, and graphics, such a map and/or navigation information. Furthermore, such data communications may also include web pages from Internet sites that are accessed by the user of the mobile communications device 24. In the embodiment illustrated, the mobile communications device 24 includes a global positioning system (GPS) receiver that is operable to receive signals from a GPS satellite 28, and use such signals to determine a location of the mobile communications device 24. GPS is a well known positioning system and GPS receivers receive signals from different GPS satellites 28 when making a position determination. While a single GPS satellite 28 is illustrated in FIG. 1, it will be understood that numerous such satellites are present in the GPS satellite system. The mobile communications device 24 of FIG. 1 may also engage in bi-directional communication with a communications satellite 32, which relays such signals to a network management center 36. While only a single communications satellite 32 and network management center 36 are illustrated, it will be understood that numerous such components may be present in such a network. The mobile communications device 24 may also communicate with a wireless base station 40 using well known digital and/or analog cellular communications. As will be understood, a system 20 may include numerous different wireless base stations 40 that provide coverage to a mobile communications device 24. Furthermore, while only a single communications device 24 is illustrated, it will be understood that numerous different mobile communications devices 24 are typically present in a system.

In one exemplary embodiment, the mobile communications devices 24 are associated with a particular fleet vehicle of a business, such as a trucking business. While the mobile communications device 24 of FIG. 1 is illustrated as capable of receiving communications from a GPS satellite, communicating with a communications satellite 32, and with a wireless base station 40, it will be understood that such mobile communications devices may communicate with wireless base stations only, without having a GPS receiver or RF transceiver capable of communicating with communications satellite 32. Similarly, the mobile communications device may conduct two way communications only through communications satellite 32, in which case the mobile communications device would not communicate with wireless base station 40. Furthermore, it will be understood that mobile communications devices 24 have numerous different applications in businesses and industries that are different than fleet vehicle applications, and that the exemplary embodiment describing such an application is for the purposes of illustration and discussion only. Such mobile communications devices 24 may be used by any business that desires to provide a mobile communications device 24 to a worker.

With continuing reference to FIG. 1, data communications through the network management center 36 and/or wireless base station 40 are forwarded to server 44, which provides access to a business management computer 48 and a distributed data network 52. Note, while shown as separate entities, wireless base station 40, network management center 36 and business management computer 48 may be integrated into server 44. Business management computer 48 may be, for example, a business server that provides data related to the business to a user of the mobile communications device 24, or may provide access to data related to the business either directly or through other components that may be connected to the business management computer 48. Distributed data network 52 is a medium used to provide communications links between various devices and computers connected to the network 52, and may include permanent connections, such as wire or fiber optic cables, or temporary connections made through telephone connections. In the depicted example, server 44 is connected to network 52, along with a remote server 56. While a single remote server is illustrated, typical systems include numerous different remote servers that are capable of providing date over the network 52. These remote servers 56, may be, for example, personal computers or network computers. Furthermore, in one embodiment, the business management computer 48 is connected to server 44 by the network 52, rather than a direct connection to the server 44. In the depicted example, distributed data network 52 is the Internet, representing a worldwide collection of networks and gateways that use conventional Internet protocols, such as, the TCP/IP suite of protocols to communicate with one another. Of course, distributed data network 52 also may be implemented as a number of different types of networks such as, for example, an intranet or a local area network. Furthermore, such different types of networks may be accessed through a remote server 56.

Thus, a mobile communications device 24 communicating through the network management center 36 and/or wireless base station 40 may connect to remote servers 56 through the server 44 via the distributed data network 52 and also may access other directly connected or network processors, such as business management computer 48 in the event that access to either of such entities is desired. Voice communications from the mobile communications device 24 may be routed through a public switched telephone network (PSTN) 60 to provide access to other voice devices that are coupled to the PSTN 60.

Figure 2:
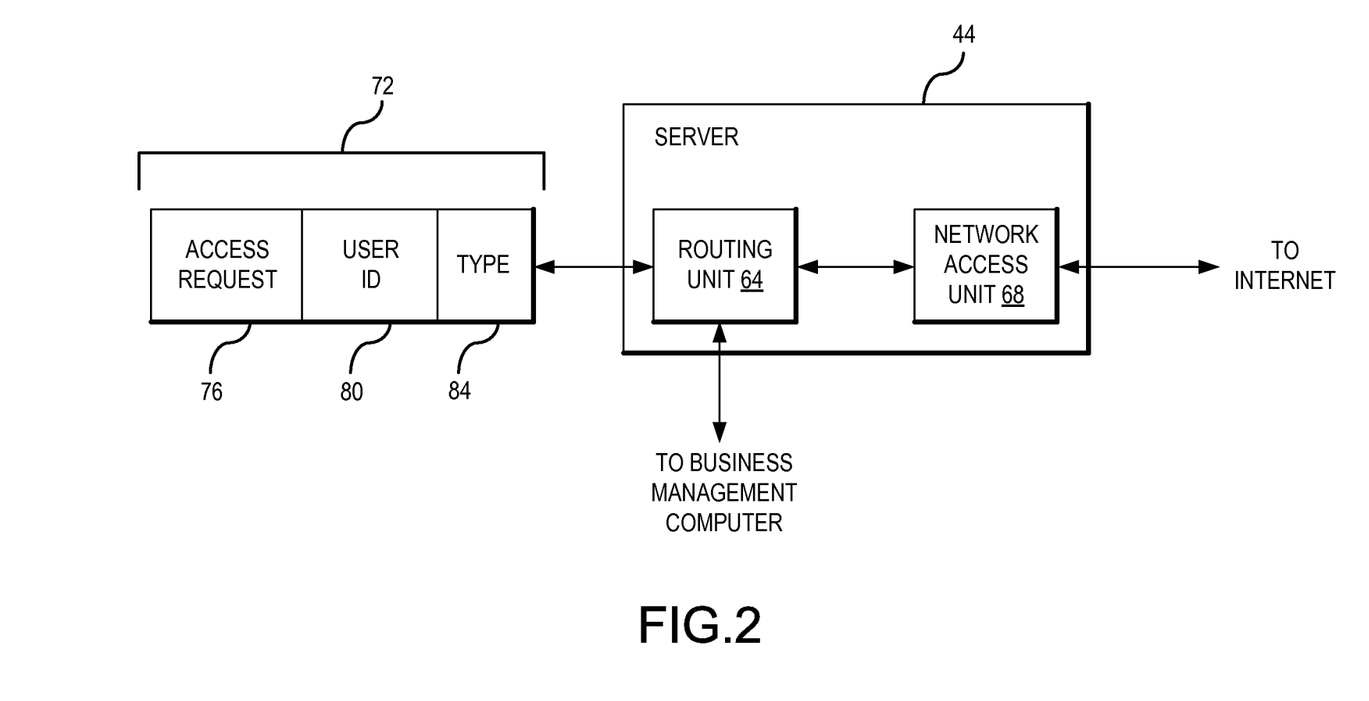
FIG. 2 is a block diagram of a server of an exemplary embodiment.

Referring now to FIG. 2, a block diagram of a server 44 configured in accordance with an exemplary embodiment is described. The server 44, in this embodiment, includes a routing unit 64 and a network access unit 68. The routing unit 64 is operable to receive a data message 72 that includes an access request 76. The access request 76 may include, for example, a network address, Internet Protocol address, an application name, domain name, or other identifier of a resource that is desired to be accessed by an operator of the mobile communications device. The network address included in the access request 76 may identify a network address associated with the business management computer such as when the operator of the mobile communications device desires to access data stored at the business management computer. In the event that the operator of the mobile communications device desires to access a network location that is not associated with the business management computer such as, for example, an Internet site, the access request is routed through the routing unit 64 to a network access unit 78, which may then provide connectivity to an external network site such as an Internet site. The data message 72, in this embodiment, also includes a user identification 80 and a data message type 84. In this embodiment, the user identification is used to log various different network access requests made by the operator of the mobile communications device. The log of network accesses may then be analyzed in order to provide appropriate billing for business and/or personal network access requests.

The type field 84 identifies whether a particular data message includes an access request 76 that is a business type access request or a personal type access request. In the event an access request is a personal access request, this is indicated in the type field 84. Similarly, if the access request is a business type access request, this is also indicated in the type field 84. In one embodiment, the user of the mobile communications device inputs the data access request into the device using a user interface associated with the mobile communications device. The mobile communications device may include an application to receive such requests, which includes an entry for the request, such as a URL, and following the input of the request prompt the user to indicate if the request is a business request or a personal request. The type of request may then be encoded into the data massage 72 in the type field 84 as, for example, a flag that may be set to indicate a personal type request. Upon receiving the data message 72, the routing unit 64 logs the access request to the business management computer and passes the access request to the network access unit 68, which then provides the appropriate access to the Internet or other network address. The business management computer in this embodiment may be used to determine the amount of personal type requests that were made by a particular operator, and provide a bill to the user to cover the costs of the personal access request.

While the data message 72 is illustrated in FIG. 2 as having several different data fields therein, other embodiments may have more or fewer such data fields. For example, in one embodiment, the message 72 contains only the access request, and does not contain a user ID field 80 or type field 84. In this embodiment, the routing unit may determine an identification of the mobile communications device that transmitted the request, such as a telephone number associated with the mobile communications device, and provide this to the management computer. The routing unit, in this embodiment, contains a listing of network access sites that are designated as network sites that are for business purposes. In this embodiment, when it is determined that the access request 76 is for a network site that is listed in the listing of designated business sites, the access request is forwarded to the network access unit 68 in order to access the appropriate site, and the routing unit logs the access request as a business type access request. In the event that the access request 76 is for a network that is not designated in the listing of business sites, the routing unit logs this access request to the business management computer as a personal type access request, and provides the request to the network access unit. The request is then completed, and the business or personal use logged in the business management computer that may then be used for billing purposes to the user of the mobile communications device.

In still further embodiments, the access request is identified as a personal type access request or a business type access request based on one or more other characteristics of the access request. For example, routing characteristics of the access request may be analyzed to determine the access request is a business type or personal type request. In such a case, an access request may be for a particular network portal, with business type access requests provided to a business portal that contains data that has been designated as business use data. Thus, if the access request is not directed to a business portal, it is determined that the request is a personal type request. In another embodiment, the content of the data requested may be analyzed to determine if the request was a business or personal type request. In such an embodiment, data containing specified keywords may be designated as business data, and requests to access such data are determined to be business type access requests. Various examples of such embodiments are described in more detail below.

While the above embodiments describe logging business and personal access requests for purposes of billing the user of a mobile communications device for personal use, the routing unit 64 may only log access requests that made for business purposes. In this manner, the business accesses may be logged with any remainder of the network access requests, therefore being personal requests, and billed appropriately. Similarly, only personal type access requests may be logged and thus billed to the user appropriately, with the remainder of the access requests not logged and billed to the business. In other embodiments, the routing unit 64 provides a record of all network access requests for a particular mobile communications device having information related to the access request, and the management computer then determines if the access request was a personal type or business type access request.

Figure 3:
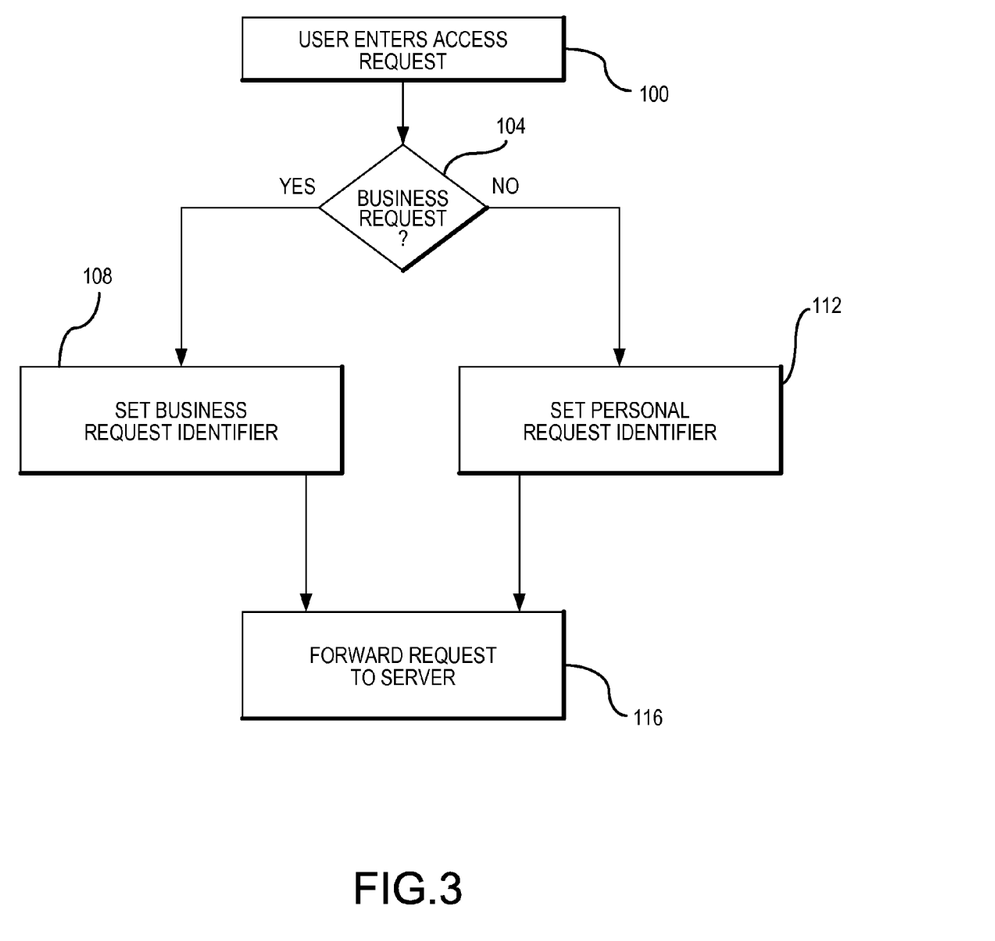
FIG. 3 is a flow chart diagram illustrating the operational steps of a mobile terminal of an exemplary embodiment.

Referring now to FIG. 3, a flow chart illustration of the operational steps of a mobile communications device for an exemplary embodiment is described. In this embodiment, the user enters an access request to the mobile communications device, as noted at block 100. At block 104, it is then determined if the access request is a business request. In one embodiment, the user indicates when entering the request if the request is a business request or a personal request. In other embodiments, the mobile communications device determines if the access request is a business or personal request based on characteristics of the request, as will be described in more detail below. If it is determined that the request is a business request, a business request identifier is set at block 108. Such a business request identifier may then be used by the server to identify the access request as a business request, and thus generate the appropriate billing to the business for the network access request. If it is determined that the network access request is not a business request, a personal request identifier is set according to block 112. In one embodiment, the mobile communications device provides a warning to the operator that such a request will result in the operator being personally charged for the access request. Finally, at block 116, the request is forwarded to the server through the appropriate wireless network link. In this manner, the server may log the request appropriately to provide billing to the user of the network access device.

While the embodiment of FIG. 3 illustrates a user designating a particular request as a business or personal request, other embodiments simply see an access request from a user and forwards the request to the server. The server or the communication device, similarly as described above, may then determine based on other characteristics of the request if the request is a business of personal type request to appropriately log the network access request.

Figure 4:
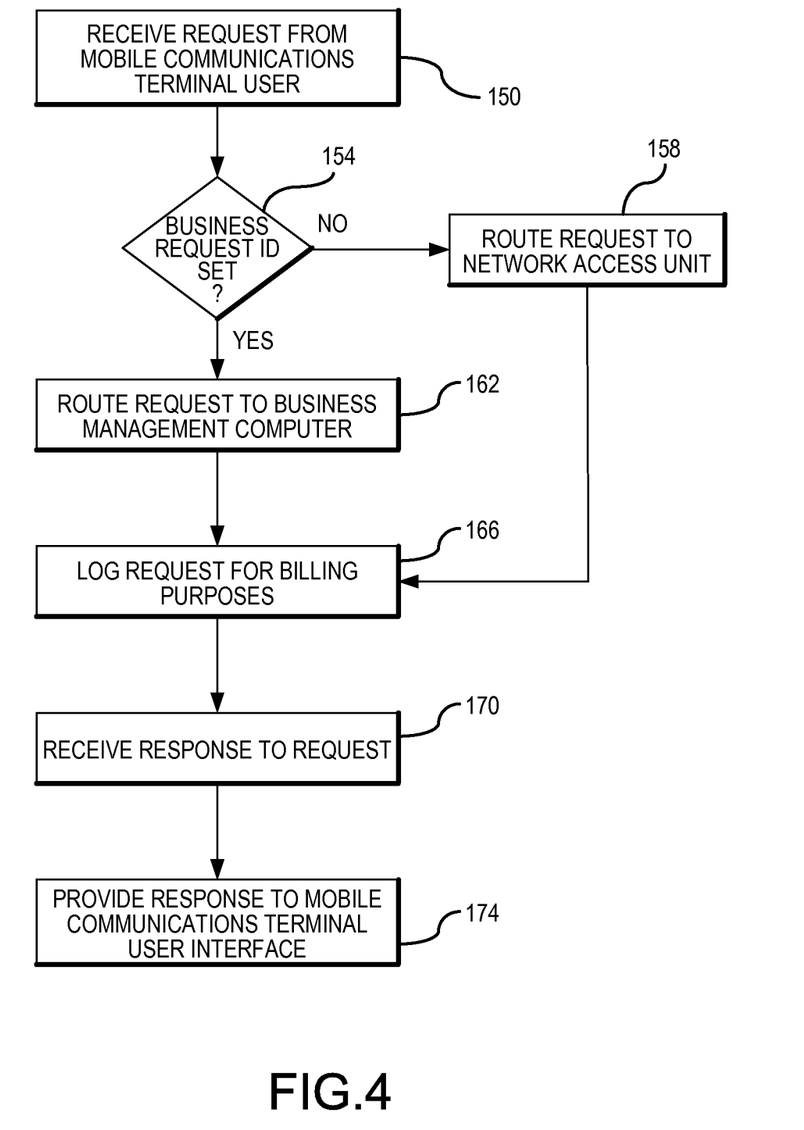
FIG. 4 is a flow chart diagram illustrating the operational steps of a server of an exemplary embodiment.

Referring now to FIG. 4, a flow chart illustration of the operational steps of an exemplary embodiment relating to a processor, whether a server, a mobile device, or a combination thereof, are described. In this embodiment, the processor receives a request from a user of a mobile communications device, as indicated at block 150. At block 154, it is determined if the business request identification has been set. In this embodiment, a user is prompted to designate if a particular access request is a business or personal request. In the event that the business request ID is set, the processor routes the request to the business management computer, as noted at block 162. In this embodiment, the business requests may all be satisfied by routing the request to the business management computer, with the business management computer then providing the appropriate data access for the business request. Alternatively, in the event that the business request ID is set, the business management computer may route the request to the network access unit in the event that the network access request is for a site that is not available through the business management computer. If it is determined at block 154 that the business request ID has not been set, the request is routed to the network access unit to provide access to the network site requested, as noted at block 158. At block 166, the request is logged for billing purposes. Similarly as described above, the request may be logged to the business management computer in order to provide appropriate billing to the business and/or user for particular network access requests. As mentioned above, the business management computer may log the network access requests as being personal requests, with the remainder of the requests noted as business requests, the business management computer may record personal access requests and thus designate the remaining requests as business requests for billing purposes, or the business management computer may log all of the requests and designate each as business or personal. At block 170, the processor receives a response to the network access request from the appropriate device that the request was routed to. Finally, at block 174, the processor provides the response to the user interface.

Figure 5:
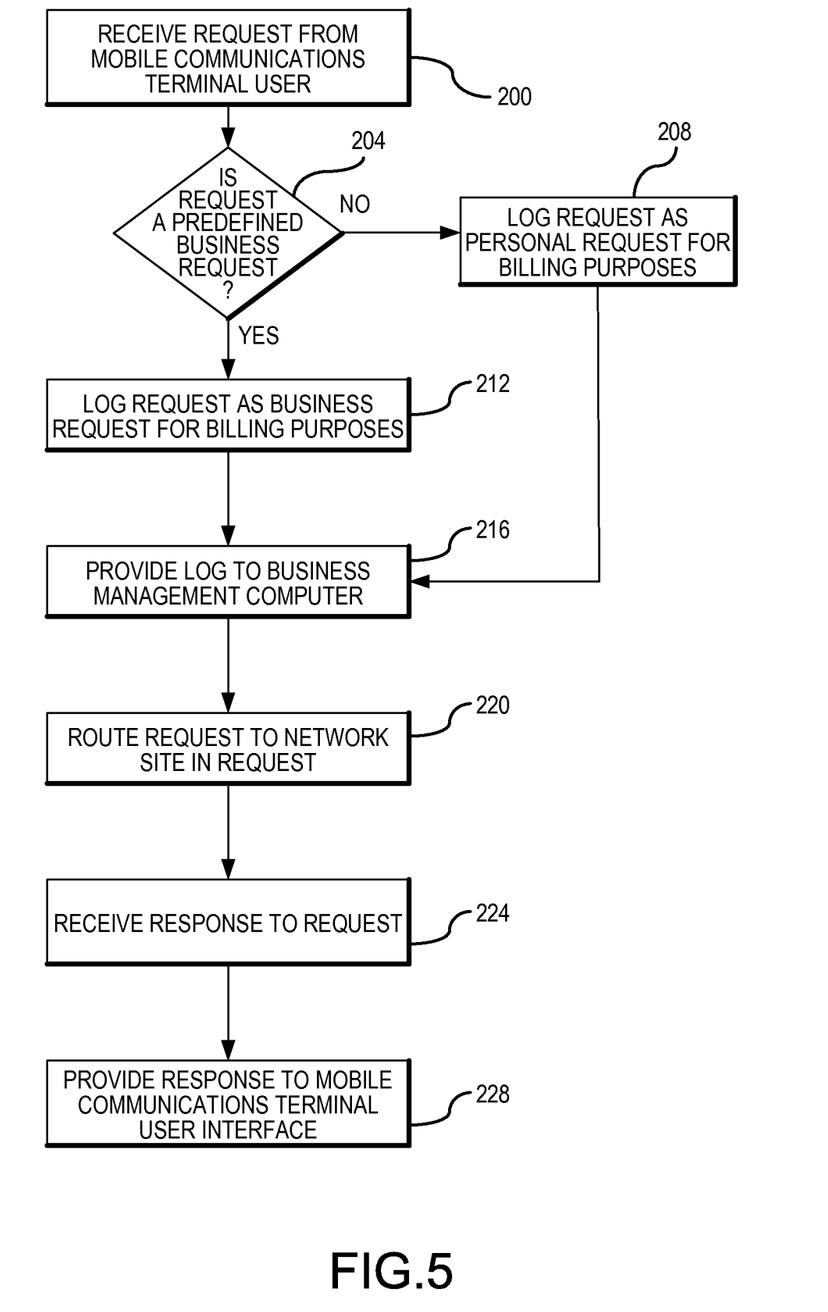
FIG. 5 is a flow chart diagram illustrating the operational steps of a server of another exemplary embodiment.

Referring now to FIG. 5, a flow chart illustration of the operational steps of another exemplary embodiment are described. Initially, at block 200, a request is received from a user of mobile communications device. At block 204, it is determined if the request is for a predefined business network site. In one embodiment, the routing unit within the server includes a listing of network sites that are designated as business access sites. In another embodiment, the mobile communications device includes a listing of network sites that are designated as business access sites. Such a listing may be provided by the business management computer and accessed as necessary, or may be pushed to the server and/or mobile device periodically. In the event that a request is not contained in this listing, as noted at block 208, the request is logged as a personal request for billing purposes. In the event that the request is a business request, the request is logged as a business request for billing purposes, as noted at block 212. At block 216, the log is provided to the business management computer. At block 220, the request is routed to the appropriate one of the network access unit or fleet management computer, as necessary to fulfill the request. At block 224, the a response to the request is received, which is then provided at block 228 to a user interface of the mobile communications device.

Figure 6:
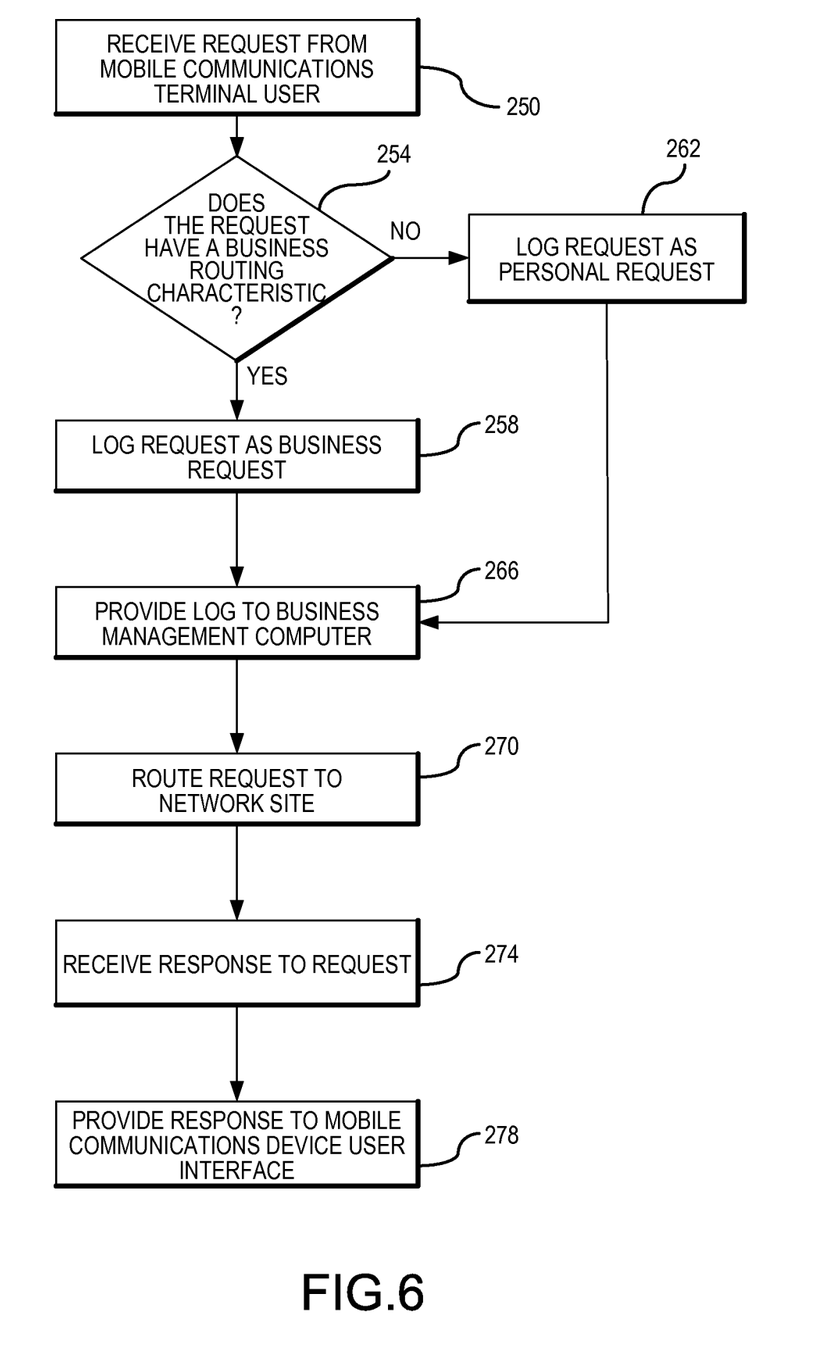
FIG. 6 is a flow chart diagram illustrating the operational steps of a server of another exemplary embodiment.

Referring now to FIG. 6, the operational steps of yet another exemplary embodiment are illustrated. In this embodiment, the a request for data access is received, as indicated at block 250. At block 254, it is determined if the request has business routing characteristic. In this embodiment, the server includes a listing of routing characteristics that are designated as routing characteristics that are for business purposes. In another embodiment, the mobile communications device includes a listing of routing characteristics that are designated as routing characteristics that are for business purposes. The listing may be provided by the business management computer and accessed as necessary, or may be pushed to the server and/or mobile device periodically. Such a listing may include, for example, uniform resource locators (URLs) that are associated with business access requests. Such URLs may include URLs of business sites that are regularly accessed by operators of the mobile communications devices for business purposes. Such routing characteristics may also include a network portal that is being accessed, with one or more portals being designated as business portals, and any other portals thus being personal portals. In such an embodiment, the business may have one or more sites available through a particular network portal that may be accessed to obtain business related information, such as load assignments, maps, and/or navigation information. Access requests that are routed to the business portal may then be identified as business requests, and logged as such according to block 258. In the event that the access request does not have a business routing characteristic, the request is logged as a personal request, as noted at block 262. The logged request is forwarded to the business management computer, as noted at block 266, and used for billing the particular user of the mobile communications device for personal access. The request is then routed to the appropriate network access site designated in the network access request, as indicated at block 270. At block 274, a response is received to the network access request that is then, at block 278, provided to a user interface of the mobile communications device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the technology of the present application. Various modifications to these embodiments will be readily apparent to those skilled in the art, and the generic principles defined herein may be applied to other embodiments without departing from the spirit or scope of the application. Thus, the technology of the present application is not intended to be limited to the embodiments shown herein but is to be accorded the widest scope consistent with the principles and novel features disclosed herein.

The invention claimed is:

1. A method for providing business and personal data access to wireless communications devices in communication with a server that has access to a network, comprising:
    receiving from a wireless communications device via a routing unit in said server, a request to access data located at a network site, wherein said request is encoded in a data message, which comprises a network address of a resource desired to be accessed by a user of said wireless communications device, and said routing unit provides connectivity to said network site;
    accessing said data located at said network site via said routing unit, based on said network address in said received request;
    analyzing said accessed data from said network site to determine whether said data corresponds to business type data or personal type data;
    processing said received request in a first manner when said received request is determined to correspond to a business type access request, based at least in part on said analyzed accessed data; and
    processing said received request in a second manner when said received request is determined to correspond to a personal type access request, based at least in part on said analyzed accessed data.

2. The method of claim 1, wherein said received request comprises a request type field that identifies whether said received request is determined to correspond to said business type access request or said personal type access request.

3. The method of claim 2,
    wherein said request type field comprises a request identifier, and
    wherein analyzing said accessed data from said network site comprises:
        designating at least one identifier as corresponding to said personal type access request;

comparing said request identifier associated with said received request to said at least one designated request identifier; and determining that said received request corresponds to said personal type access request when said request identifier associated with said received request matches said at least one designated request identifier.

4. The method of claim 2,
wherein said request type field comprises a request identifier, and
wherein analyzing said accessed data from said network site comprises:
designating at least one identifier as corresponding to said business type access request;
comparing said request identifier associated with said received request to said at least one designated request identifier; and
determining that said received request corresponds to said business type access request when said request identifier associated with said received request matches said at least one designated request identifier.

5. The method of claim 1, wherein processing said received request in a first manner comprises billing a business entity associated with the wireless communications device.

6. The method of claim 1, wherein processing said received request in a second manner comprises billing a user associated with the wireless communications device.

7. The method of claim 6, wherein billing a user comprises:
storing an identification associated with a first user ID;
determining a requesting user ID associated with said personal type access request; and
matching said requesting user ID to said first user ID; and
logging said personal type access request in an account associated with said first user ID.

8. The method of claim 1, wherein said received request comprises a first uniform resource locator (URL).

9. The method of claim 1, wherein analyzing said accessed data from said network site comprises:
determining a routing characteristic of said received request;
determining that said received request corresponds to said business type access request when said routing characteristic matches a business-related routing characteristic; and
determining that said received request corresponds to said personal type access request when said routing characteristic does not match a business-related routing characteristic.

10. The method of claim 1, wherein analyzing said accessed data from said network site comprises:
determining that said received request corresponds to said business type access request when said accessed data corresponds to business type data; and
determining that said received request corresponds to said personal type access request when said accessed data does not correspond to business type data.

11. The method of claim 10, wherein analyzing said accessed data from said network site further comprises:
searching said accessed data for keywords related to business type data; and
determining that said accessed data corresponds to business type data when a predetermined number of keywords related to business type data are present in said accessed data.

12. An apparatus for providing business and personal data access to wireless communications devices provided by a business entity, the apparatus comprising a computer, the computer comprising:
a network access unit at a server; and
a routing unit at said server, the routing unit providing connectivity to said network site, and the routing unit for:
receiving from a wireless communications device, a request to access data located at a network site, wherein said request is encoded in a data message, which comprises a network address of a resource desired to be accessed by a user of said wireless communications device;
accessing said data located at said network site, based on said network address in said received request; and
analyzing said accessed data from said network site to determine whether said data corresponds to business type data or personal type data.

13. The apparatus of claim 12, wherein said computer is further for processing said received request in a first manner when said received request is determined to correspond to a business type access request, based at least in part on said analyzed access data, and for processing said received request in a second manner when said received request is determined to correspond to a personal type access request, based at least in part on said analyzed access data.

14. The apparatus of claim 13, wherein processing said received request in said first manner comprises billing an account associated with said business entity.

15. The apparatus of claim 13, wherein processing said received request in said second manner comprises billing an account associated with a user of said wireless communications device.

16. The apparatus of claim 13, wherein said received request comprises a request type field that identifies whether said received request corresponds to said business type access request or said personal type access request.

17. The apparatus of claim 16, wherein said request type field comprises a request identification field.

18. The apparatus of claim 17, wherein said routing unit is further for:
comparing a first request identification contained in said request identification field to at least one designated request identification, said at least one designated request identification indicative of said personal type access request; and
determining that said received request corresponds to said personal type access request when said first request identification matches said at least one designated request identification.

19. The apparatus of claim 13, wherein said routing unit is further for determining a uniform resource locator (URL) associated with said received request and for determining that said received request corresponds to said business type access request when said URL matches a URL of a set of predefined business type URLs.

20. A non-transitory tangible data storage medium comprising executable data capable of causing a programmable device to perform:
receiving from a wireless communications device via a routing unit in a server, a request to access data located at a network site, wherein said request is encoded in a data message, which comprises a network address of a resource desired to be accessed by a user of said wireless communications device, and said routing unit provides connectivity to said network site;
accessing said data located at said network site via said routing unit, based on said network address in said received request;
analyzing said accessed data from said network site to determine whether said data corresponds to business type data or personal type data;
processing said received request in a first manner when said received request is determined to correspond to a business type access request, based at least in part on said analyzed accessed data; and
processing said received request in a second manner when said received request is determined to correspond to a personal type access request, based at least in part on said analyzed accessed data.

21. The non-transitory tangible data storage medium of claim 20, wherein said received request comprises a request type field that identifies whether said received request corresponds to a business type access request or a personal type access request.

22. The non-transitory tangible data storage medium of claim 21,
wherein said request type field comprises a request identifier, and
wherein analyzing said accessed data from said network site comprises:
designating at least one identifier as corresponding to said personal type access request;
comparing said request identifier associated with said received request to said at least one designated request identifier; and
determining that said received request corresponds to said personal type access request when said request identifier associated with said received request matches said at least one designated request identifier.

23. The non-transitory tangible data storage medium of claim 21,
wherein said request type field comprises a request identifier, and
wherein analyzing said accessed data from said network site comprises:
designating at least one identifier as corresponding to said business type access request;
comparing said request identifier associated with said received request to said at least one designated request identifier; and
determining that said received request corresponds to said business type access request when said request identifier associated with said received request matches said at least one designated request identifier.

24. The non-transitory tangible data storage medium of claim 20, wherein processing said received request in a first manner comprises billing a business entity associated with the wireless communications device.

25. The non-transitory tangible data storage medium of claim 20, wherein processing said received request in a second manner comprises billing a user associated with the wireless communications device.

26. The non-transitory tangible data storage medium of claim 25, wherein billing a user comprises:
storing an identification associated with a first user ID;
determining a requesting user ID associated with said personal type access request;
matching said requesting user ID to said first user ID; and
logging said personal type access request in an account associated with said first user ID.

27. The non-transitory tangible data storage medium of claim 20, wherein said received request comprises a first uniform resource locator (URL).

28. The non-transitory tangible data storage medium of claim 20, wherein analyzing said accessed data from said network site comprises:
determining a routing characteristic of said received request;
determining that said received request corresponds to said business type access request when said routing characteristic matches a business-related routing characteristic; and
determining that said received request corresponds to said personal type access request when said routing characteristic does not match a business-related routing characteristic.

29. The non-transitory tangible data storage medium of claim 20, wherein analyzing said accessed data from said network site comprises:
determining that said received request corresponds to said business type access request when said accessed data corresponds to business type data; and
determining that said received request corresponds to said personal type access request when said accessed data does not correspond to business type data.

30. The non-transitory tangible data storage medium of claim 29, wherein analyzing said accessed data from said network site further comprises:
searching said accessed data for keywords related to business type data; and
determining that said accessed data corresponds to business type data when a predetermined number of keywords related to business type data are present in said accessed data.

* * * * *